United States Patent [19]

Khanna

[11] Patent Number: 5,071,948
[45] Date of Patent: Dec. 10, 1991

[54] POLYAMIDE-POLYIMIDE AND POLYBENZOXAZOLE-POLYIMIDE POLYMER

[75] Inventor: Dinesh N. Khanna, West Warwick, R.I.

[73] Assignee: Hoechst Celanese Corporation, Somerville, N.J.

[21] Appl. No.: 558,739

[22] Filed: Jul. 26, 1990

Related U.S. Application Data

[62] Division of Ser. No. 321,021, Mar. 9, 1989, Pat. No. 4,980,447.

[51] Int. Cl.$^5$ .................. C08G 69/12; C08G 73/10
[52] U.S. Cl. .................... 528/331; 528/125; 528/184; 528/188; 528/353
[58] Field of Search ............ 528/331, 125, 128, 184, 528/188, 353

[56] References Cited

U.S. PATENT DOCUMENTS 4,954,613  9/1990  Hudson ........................... 528/271
4,980,447  12/1990 Khanna ........................... 528/184

Primary Examiner—Harold D. Anderson

[57] ABSTRACT

The present invention provides polyamide-polyimide and polybenzoxazole-polyimide polymers derived therefrom with improved processing and film characteristics having incorporated into the polymeric backbone the polymeric condensation residuum of novel aromatic diamino compounds having the formula:

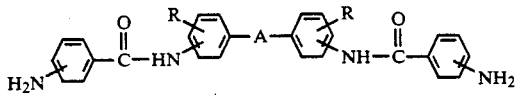

wherein A is selected from the group consisting of $SO_2$, O, S, CO, $C_1$ to $C_6$ alkyl, perfluoroalkyl or perfluoroarylalkyl having from 1 to 10 carbon atoms and a carbon-carbon double bond directly linking the two aromatic groups, and R is hydrogen.

The polyamide-polyimide polymers of this invention are prepared by reacting compounds of the above formula, alone or admixed with other aromatic diamines, with one or more aromatic tetracarboxylic acids or anhydrides thereof. Polybenzoxazole-polyimide derivatives of such polyamide-polyimide.

11 Claims, No Drawings

POLYAMIDE-POLYIMIDE AND POLYBENZOXAZOLE-POLYIMIDE POLYMER

This is a divisional of copending application Ser. No. 07/321,021 filed on 3-9-89 now U.S. Pat. No. 4,980,447.

BACKGROUND OF THE INVENTION

1. Field of the Invention

This invention relates to new fluorine-containing polyamide-polyimide polymers and polybenzoxazole-polyimide polymers derived therefrom which exhibit improved thermal stability, improved resistance to solvents, good processability, good film-forming properties and good film characteristics.

2. Description of Related Art

Polyimides derived from aromatic diamine and dianhydride monomers are widely used in the aerospace industry and electronics industry because of their toughness, low density, thermal stability, radiation resistance, mechanical strength and good dielectric properties. However, such polyimides are often difficult to process thermally and thin films prepared therefrom are often brittle and lack acceptable optical transparency.

It has been suggested that aromatic polyimides having the hexafluoroisopropylidene linking group in the diamine and/or dianhydride monomer have improved solubility and processing properties. For example, U.S. Pat. No. 3,356,648 to Rogers discloses polyimides prepared from 2,2-bis(4-aminophenyl) hexafluoropropane; U.S. Pat. No. 4,592,925 to DuPont discloses polyimides prepared from 2,2-bis(3-aminophenyl) hexafluoropropane; U.S. Pat. No. 4,111,906 to Jones et al. discloses polyimides prepared from 2,2-bis[4-(4-aminophenoxy)-phenyl] hexafluoropropane; and U.S. Pat. No. 4,477,648 to Jones et al. discloses polyimides prepared from 2,2-bis[(2-halo-4-amino-phenoxy)phenyl] hexafluoropropane. U.S. Pat. No. 4,592,925 discloses polyimides prepared by reacting 2,2-bis(3-aminophenyl) hexafluoropropane and 4,4'-hexafluoroisopropylidene-bis (phthalic anhydride), also known as 2,2-bis(3,4-dicarboxyphenyl) hexafluoropropane dianhydride.

In addition, U.S. Pat. No. 3,179,635 discloses the preparation of polyamide-polyimide polymers said to have good thermal stability and good film-forming properties which may be prepared by condensing a tetra functional aromatic dianhydride, an aromatic diamine and an aromatic acid halide. U.K. patent application GB-2188936A discloses the preparation of polyamides and polybenzoxazole derivatives thereof based on the condensation product of 2,2-bis(3-amino-4-hydroxyphenyl)-hexafluoropropane with an aromatic dicarboxylic acid or acid halide, followed by cyclization of the polyamide to form a polybenzoxazole.

In applicant's co-pending application Ser. No. 076,098, filed in the United States Patent and Trademark Office on July 21, 1987, is disclosed hydroxy polyimide polymers which, in the preferred embodiment, are prepared by forming the polymeric condensation product of hexafluoro-2,2-bis(3-amino-4-hydroxyphenyl) propane and 2,2-bis(3,4-dicarboxyphenyl) hexafluoropropane dianhydride. These polymers are particularly useful in the preparation of photoresist compositions.

Whereas the above-referred to polyimides, polyamide-polyimide and polybenzoxazole polymers are useful for the utilities disclosed, it is desirable to provide polyamide-polyimide polymers and polybenzoxazole polymers which provide not only superior thermal and thermooxidative stability, but also excellent thermal processibility, excellent resistance to solvents, low moisture uptake, low dielectric constant and good film-forming properties and film characteristics.

SUMMARY OF THE INVENTION

The present invention provides polyamide-polyimide and polybenzoxazole-polyimide polymers derived therefrom with improved processing and film characteristics having incorporated into the polymeric backbone the polymeric condensation residuum of novel aromatic diamino compounds having the formula:

wherein A is selected from the group consisting of $SO_2$, O, S, CO, $C_1$ to $C_6$ alkyl, perfluoroalkyl or perfluoroarylalkyl having from 1 to 10 carbon atoms and a carbon-carbon double bond directly linking the two aromatic groups, and R is selected from the group consisting of hydrogen, hydroxy and $C_1$ to $C_4$ alkoxy.

The polyamide-polyimide polymers of this invention are prepared by reacting compounds of Formula I, alone or admixed with other aromatic diamines, with one or more aromatic tetracarboxylic acids or anhydrides thereof. Polybenzoxazole-polyimide derivatives of such polyamide-polyimide polymers are prepared utilizing compounds of Formula I wherein R is hydroxy or $C_1$ to $C_4$ alkoxy, and by subjecting the resulting alkoxy or hydroxy-substituted polyamide-polyimide to a dehydrating and cyclizing reaction to form the oxazole linkage which gives rise to polybenzoxazole-polyimide polymer.

DETAILED DESCRIPTION OF THE INVENTION

In the more preferred embodiment of the present invention, the R substituent and the amide linkage in Formula I are interchangeably in the meta or para positions with respect to the A group, and the amino substituent groups are meta or para with respect to the amide linkage.

In the most preferred embodiment of the invention, A is a hexafluoroisopropylidene group

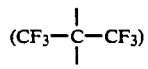

or a 1-phenyl-2,2,2-trifluroethane group

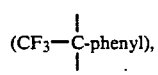

and R is hydroxy. Compounds having the structure of Formula I are disclosed in Applicant's copending application D-1278 filed in the United States Patent and Trademark Office on even date herewith, the disclosure of which application is incorporated herein by reference.

One embodiment of the polyamide-polyimide polymers of this invention may be characterized as a polymer comprising recurring group of the structure:

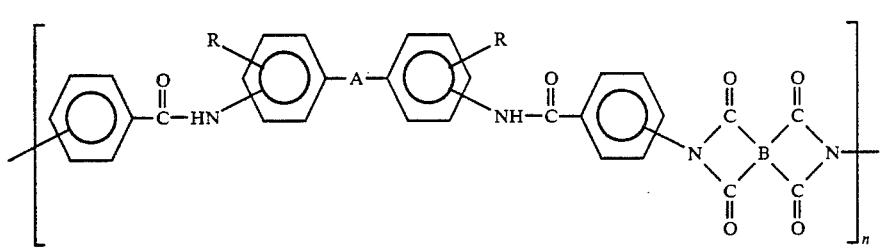

wherein the moiety B is a substituted or unsubstituted tetravalent aromatic radical selected from the group consisting of a benzene nucleus, polyphenyl nuclei having up to four phenyl rings, and naphthalene nuclei, n is an integer sufficient to give rise to a polymer having an inherent viscosity of at least 0.1 dl/g as measured from a solution of the polymer in dimethylacetamide at 25 degrees Celsius at a polymer concentration of 0.5 weight percent, and A and R are as set forth above in Formula I. In the moiety B, each pair of carbonyl groups are attached to adjacent carbon atoms in a ring of the moiety B.

Another preferred embodiment of this invention relates to polybenzoxazole polyimide polymers comprising at least one recurring group of the structure:

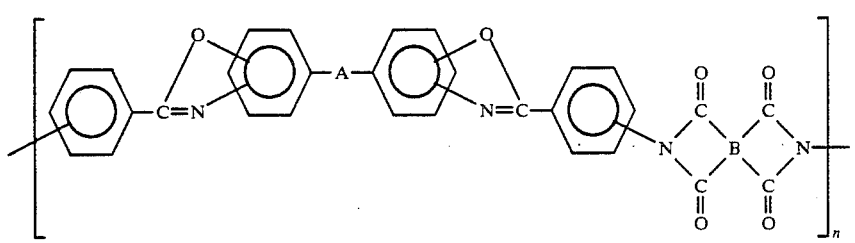

wherein A, B and n are as defined above. These polybenzoxazole polymers are derived from polyamide-polyimide polymers of Formula II, wherein R is hydroxy or $C_1$ to $C_4$ alkoxy positioned interchangeably at the meta or para positions with respect to the A moiety, which are prepared by cyclization of the amide linkage to form the oxazole linkage.

Also within the scope of polymers of Formulas II and III are copolyamide-polyimides and polybenzoxazoles derived therefrom wherein a mixture of the diamine of Formula I and at least one different diamine are copolymerized, such a represented by the formula:

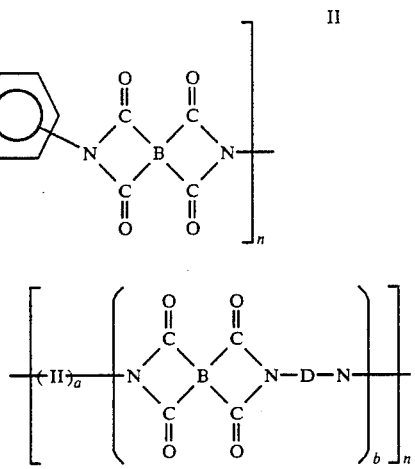

wherein (II) represents a single condensed unit of Formula II, D represents the residuum of a different aromatic diamine which may or may not contain an R substituent as defined above on the aryl nucleus, B and n are as defined above, and (a) and (b) equal the mole fraction of each recurring unit in the polymer chain. Preferred polymers and copolymers of the structure IV are those where the mole fractions of (a) and (b) are:

a=0.01 to 1.0 b=0.0 to 0.99;

more preferably:

a=0.5 to 1.0 b=0.0 to 0.5;

and most preferably:

a=0.7 to 1.0 b=0.0 to 0.3

Polyamide-copolyimides and polybenzoxazoles derived therefrom within the scope of Formulas II and III may also be prepared where the diamine of Formula I is copolymerized with two or more different aromatic dianhydrides such as represented by the formula:

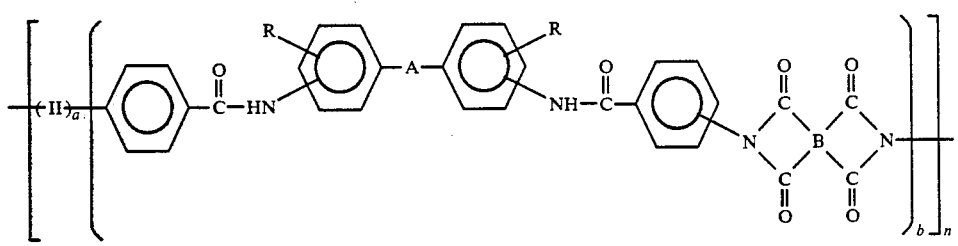

wherein B' represents a tetravalent aromatic dianhydride of the B category but different from the B component present in (II), and (II), A, R, a, b and n are as defined above.

Polybenzoxazoles having a structure analogous to the structures of Formulas IV and V, wherein R is hydroxy or $C_1$ to $C_4$ alkoxy positioned interchangeably at the meta and para positions with respect to the A moiety, may be prepared by cyclizing the amide linkage to form the oxazole linkage as set forth above.

Preferred dianhydrides suitable for use in the present invention are benzene and naphthalene tetracarboxylic acid dianhydrides and diphenyl dianhydrides having the nuclear structure:

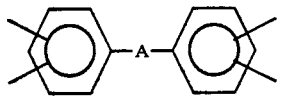

wherein A is as defined above in Formula I. Most preferred dianhydrides are those where A is a hexafluoroisopropylidene group or a 1-phenyl-2,2,2-trifluoroethane group.

Illustrative of tetracarboxylic acid dianhydrides which are suitable for use in the present invention are:
1,2,4,5-benzene tetracarboxylic acid dianhydride;
1,2,3,4-benzene tetracarboxylic acid dianhydride;
1,4-bis(2,3-dicarboxyphenoxy) benzene dianhydride;
1,3-bis(3,4-dicarboxyphenoxy) benzene dianhydride;
1,2,4,5-naphthalene tetracarboxylic acid dianhydride;
1,2,5,6-naphthalene tetracarboxylic acid dianhydride;
1,4,5,8-naphthalene tetracarboxylic acid dianhydride;
2,3,6,7-naphthalene tetracarboxylic acid dianhydride;
2,6-dichloronaphthalene-1,4,5,8-tetracarboxylic acid dianhydride;
2,7-dichloronaphthalene-1,4,5,8-tetracarboxylic acid dianhydride;
2,3,6,7-tetrachloronaphthalene-1,4,5,8-tetracarboxylic acid dianhydride;
3,3',4,4'-diphenyl tetracarboxylic acid dianhydride;
2,2',3,3'-diphenyl tetracarboxylic acid dianhydride;
4,4'-bis(3,4-dicarboxyphenoxy)diphenyl dianhydride;
bis(2,3-dicarboxyphenyl) ether dianhydride;
4,4'-bis(2,3-dicarboxyphenoxy) diphenyl ether dianhydride;
4,4'-bis(3,4-dicarboxyphenoxy) diphenyl ether dianhydride;
bis(3,4-dicarboxyphenyl) sulfide dianhydride;
4,4'-bis(2,3-dicarboxyphenoxy) diphenyl sulfide dianhydride;
4,4'-bis(3,4-dicarboxyphenoxy) diphenyl sulfide dianhydride;
bis(3,4-dicarboxyphenyl) sulfone dianhydride;
4,4'-bis(2,3-dicarboxyphenoxy) diphenyl sulfone dianhydride;
4,4'-bis(3,4-dicarboxyphenoxy) diphenyl sulfone dianhydride;
3,3',4,4'-benzophenone tetracarboxylic acid dianhydride;
2,2',3,3'-benzophenone tetracarboxylic acid dianhydride;
2,3,3'4'-benzophenone tetracarboxylic acid dianhydride;
4,4'-bis(3,4-dicarboxyphenoxy) benzophenone dianhydride;
bis(2,3-dicarboxyphenyl) methane dianhydride;
bis(3,4-dicarboxyphenyl) methane dianhydride;
1,1-bis(2,3-dicarboxyphenyl) ethane dianhydride;
1,1-bis(3,4-dicarboxyphenyl) ethane dianhydride;
1,2-bis(3,4-dicarboxyphenyl) ethane dianhydride;
2,2-bis(2,3-dicarboxyphenyl) propane dianhydride;
2,2-bis(3,4-dicarboxyphenyl) propane dianhydride;
2,2-bis[4-(2,3-dicarboxyphenoxy) phenyl] propane dianhydride;
2,2-bis[4-(3,4-dicarboxyphenoxy) phenyl] propane dianhydride;
4-(2,3-dicarboxyphenoxy)-4'-(3,4-dicarboxyphenoxy) diphenyl-2,2-propane dianhydride;
2,2-bis[4-(3,4-dicarboxyphenoxy-3,5-dimethyl) phenyl] propane dianhydride;
2,3,4,5-thiophene tetracarboxylic acid dianhydride;
2,3,4,5-pyrrolidine tetracarboxylic acid dianhydride;
2,3,5,6-pyrazine tetracarboxylic acid dianhydride;
1,8,9,10-phenanthrene tetracarboxylic acid dianhydride;
3,4,9,10-perylene tetracarboxylic acid dianhydride;
2,2-bis(3,4-dicarboxyphenyl) hexafluoropropane dianhydride;
1,3-bis(3,4-dicarboxyphenyl) hexafluoropropane dianhydride;
1,1-bis(3,4-dicarboxyphenyl)-1-phenyl-2,2,2-trifluoroethane dianhydride;
2,2-bis[4-(3,4-dicarboxyphenoxy) phenyl] hexafluoropropane dianhydride;
1,1-bis[4-(3,4-dicarboxyphenoxy) phenyl]-1-phenyl-2,2,2-trifluoroethane dianhydride;
4,4'-bis[2-(3,4-dicarboxyphenyl)hexafluoroisopropyl] diphenyl ether dianhydride,
and mixtures thereof.

One skilled in the art will recognize that the tetracarboxylic acids and acid-esters of the above-listed dianhydride compounds may also be used to produce the polyimides. These tetracarboxylic acids or derivatives thereof are available or may be prepared by known methods. For example, U.S. Pat. No. 3,847,867 to Heath et al. and U.S. Pat. No. 4,650,850 to Howson, which are incorporated herein by reference, show the preparation of bis(ether anhydrides) and bis(dialkyl aromatic ether anhydrides), respectively. The preparation of fluorine-containing dianhydrides is disclosed in U.S. Pat. No. 3,310,573 to Gordon and U.S. Pat. No. 3,649,601 to Critchley et al., which are also incorporated herein by reference.

Copolyamide-polyimide copolymers may also be prepared using a mixture of the diamine of Formula I above and at least one other aromatic diamine having the formula:

$$NH_2—D—NH_2$$

wherein D is an aromatic moiety of a phenylene, naphthalene or bis-phenylene type compound which may be unsubstituted or ring substituted with halogen, hydroxy, $C_1$ to $C_6$ alkyl or $C_1$-$C_4$ alkoxy groups.

Illustrative of diamines which are suitable for use in a copolymerization admixture with the diamine of Formula I include:
m-phenylene diamine;
p-phenylene diamine;
1,3-bis(4-aminophenyl) propane;
2,2-bis(4-aminophenyl) propane;
4,4'-diamino-diphenyl methane;
1,2-bis(4-aminophenyl) ethane;
1,1-bis(4-aminophenyl) ethane;
2,2'-diamino-diethyl sulfide;
bis(4-aminophenyl) sulfide;
2,4'-diamino-diphenyl sulfide;
bis(3-aminophenyl)sulfone;
bis(4-aminophenyl) sulfone;
4,4'-diamino-dibenzyl sulfoxide;
bis(4-aminophenyl) ether;
bis(3-aminophenyl) ether;
bis(4-aminophenyl)diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
4,4'-bis(4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,3-diamino-adamantane;
bis[2-(3-aminophenyl)hexafluoroisopropyl] diphenyl ether;
3,3'-diamino-1,1,1'-diadamantane;
N-(3-aminophenyl)-4-aminobenzamide;
4-aminophenyl-3-aminobenzoate;
2,2-bis(4-aminophenyl) hexafluoropropane;
2,2-bis(3-aminophenyl) hexafluoropropane;
2-(3-aminophenyl)-2-(4-aminophenyl)hexafluoropropane;
2,2-bis[4-(4-aminophenoxy)phenyl] hexafluoropropane;
2,2-bis[4-(2-chloro-4-aminophenoxy)phenyl] hexafluoropropane;
1,1-bis(4-aminophenyl)-1-phenyl-2,2,2-trifluoroethane;
1,1-bis[4-(4-aminophenoxy)phenyl]-1-phenyl-2,2,2-trifluoroethane;
1,4-bis(3-aminophenyl)buta-1-ene-3-yne;
1,3-bis(3-aminophenyl) hexafluoropropane;
1,5-bis(3-aminophenyl) decafluoropentane;
4,4'-bis[2-(4-aminophenoxyphenyl) hexafluoroisopropyl] diphenyl ether;
and mixtures thereof;

Copolyamide-copolyimide polymers and polybenzoxazole polymers derived therefrom may also be prepared in accordance with this invention wherein both a mixture of the above diamines and a mixture of the above dianhydrides are reacted.

The polyamide-polyimides of this invention may be prepared by known polymerization techniques, typically by a high-temperature solution condensation method employing a condensation catalyst such as para-toluene sulfonic acid. Suitable solvents include N-methyl pyrrolidone, gamma-butyrolactone, monochlorobenzene and mixtures thereof. The reaction is preferably conducted under substantially anhydrous conditions and for a time and at a temperature sufficient to provide at least 50%, preferably at least 90%, of the corresponding polyamic acid-polyamide, and then converting the polyamic acid-polyamide to the polyamide-polyimide. Such conversions may be accomplished by adding a suitable dehydration agent such a polyphosphoric acid, acetic anhydride or a mixture thereof with beta-picoline to the polyamic acid reaction media and stirring said mixture at room temperature until imidization is substantially complete. Imidization may also be accomplished by heating the polyamic acid solution or by forming a cast film of the polyamic acid and stepwise heating the film from about 70 degrees Celsius to about 250 degrees Celsius over a period of about 4 hours.

The polyamide-polyimide polymers containing hydroxy or $C_1$-$C_4$ alkoxy substituents on aromatic carbons adjacent to the amido substituent may be readily converted into the corresponding polybenzoxazole-polyimide polymers of this invention by a further dehydrating and cyclization reaction. This reaction is well known and is preferably accomplished by heating the polyamide-polyimide polymer for a sufficient period of time and temperature to cyclize the amido/hydroxy or amido/alkoxy substituent groups to form the oxazole linkage. The preferred method for cyclization is to heat the polyamide-polyimide to a temperature of at least about 300° C. for a period of at least about 1 hour. In general, the polyamic acid precursors and the polyamide-polyimide polymers of this invention are soluble in common organic solvents, whereas the derivative polybenzoxazole polymers are not. Thus, where shaped articles such as films or composites are prepared, it is preferred to first cast or mold the desired shape, and then heat the casted or molded shape to form the solvent insoluble polybenzoxazole.

The most preferred polyimides of this invention are prepared by forming the polymeric condensation product of the diamine of Formula I above with 1,2,4,5-benzene tetracarboxylic acid dianhydride (also known as pyromelittic dianhydride-PMDA), bis(3,4-dicarboxyphenyl) ether dianhydride (also known as oxyphthalic dianhydride-ODPA), 3,3',4,4'-benzophenone tetracarboxylic acid dianhydride (also known as benzophenonetetracarboxylic dianhydride-BTDA), 3,4',4,4'-diphenyl tetracarboxylic acid dianhydride (BPDA), 2,2-bis(3,4 dicarboxyphenyl) hexafluoropropane dianhydride (6FDA), and 4,4'-bis[2-(3,4 dicarboxyphenyl) hexafluoroisopropyl] diphenyl ether dianhydride (12 FDA).

In the preferred embodiment of the present invention, the diamine and dianhydride monomers are reacted in approximately equi-molar amounts.

The following examples are illustrative in the invention.

EXAMPLE 1

Bis-N,N'-(para-nitrobenzoyl)-hexafluoro-2,2-bis(4-hydroxyphenyl)propane having the following structure is prepared:

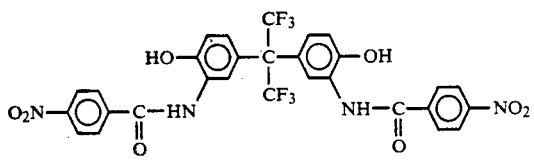

A 500 ml. round bottom flask equipped with a cooling jacket and mechanical stirrer was charged with 30.0 grams (0.082 mole) of 2,2-bis(3-amino-4-hydroxyphenyl) hexafluoropropane and 400 mls. of acetone. The mixture was stirred until the aminophenyl had dissolved, after which 39.6 grams (0.213 mole) of para-nitrobenzoyl chloride dissolved in 100 mls. of acetone was added dropwise over a period of 30 minutes. The mixture was maintained at less than 20° C. during the addition, after which the mixture was heated with agitation at 35°-40° C. for a period of two hours. 30.0 grams (0.218 mole) of potassium carbonate was then added gradually and the mixture was agitated for two additional hours at 35°-40° C. The heat was removed and the mixture was agitated for an additional 18 hours at room temperature. Thereafter, 20 mls. of water and 16 mls. of a 50% solution of sodium hydroxide was added with vigorous agitation and the mixture was heated at 50°-55° C. for 30 minutes. The heat was then removed and the mixture was transferred to a beaker and the pH was adjusted in the range of 6.0 to 7.0 by addition of HCL (37%) and 500 ml of additional water, added incrementally over a period of 30 minutes under agitation. The mixture was then filtered on an 11 cm. Buchner filter, and the precipitate was washed with water and dried in an oven at 60°-70° C. The yield of bis-N,N'-(para-nitrobenzoyl)-hexafluoro-2,2-bis(4-hydroxyphenyl) propane was 93.6% of theoretical.

EXAMPLE 2

The product of Example 1 was purified by recrystallization in accordance with the following method.

A 1000 ml. round bottom flask equipped with a mechanical stirrer was charged with 51.0 grams of the crude product of Example 1, 316 grams of acetone and 158 grams of methanol.

The mixture was stirred and heated at 40°-50° C. until the product of Example 1 had dissolved. The mixture was cooled to room temperature and 30 grams of Norite was gradually added after which the mixture was stirred for about 25 minutes. The mixture was then clarified by passing it through a 9 cm. Buchner funnel and using a small amount of a 2 to 1 mixture of acetone/methanol as a rinse. The clarified solution was then transferred to a beaker and heated to 50°-55° C. 300 mls. of warm tap water was added dropwise to the solution over a period of 30 minutes, after which the solution was heated to 60°-65° C. After removal from the heat, the solution was allowed to cool slowly to 20°-25° C. which caused a precipitate of the purified compound to be formed. The mixture was filtered using a 9 cm. Buchner funnel, washed with tap water, and oven dried at 60°-70° C. The yield of product was 44 grams which represents an 86.2% recovery.

EXAMPLE 3

This example illustrates the preparation of bis-N,N'-(para-aminobenzoyl)-hexafluoro-2,2-bis(4-hydroxyphenyl) propane by a reduction of the purified product of Example 2. The product prepared according to this Example has the structure:

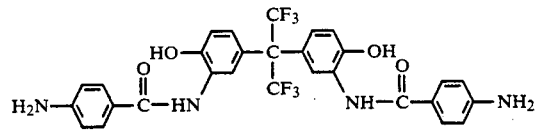

A one liter Parr bottle was charged with 20.0 grams (0.03 mole) of the purified product of Example 2, 1.0 grams of a 5% palladium on carbon catalyst and 180.4 grams of ethyl acetate to form a slurry. The slurry was purged by bubbling nitrogen gas through it for 15 minutes. The bottle was then connected to a shaker apparatus capable of maintaining intimate contact between gas, liquid and solid phases, following which the slurry was purged three times with hydrogen gas to insure a pressure tight seal. The shaker was started and the contents were subjected to 50 psi hydrogen gas while heating at 50°-55° C. The mixture was shaken for about 35 minutes. The mixture was then cooled to 35° C. After purging the resulting slurry with nitrogen, it was filtered to remove the catalyst, after which the solvent was evaporated. The product was heated in an air oven at 90° C. until dry, yielding 17.0 grams of dried product.

Other dinitro and diamino compounds within the scope of the present invention may be prepared by the processes described above or variations thereof which will be evident to those skilled in the art.

The following examples illustrate the preparation of polyamide-polyimide polymers and the polybenzoxazole derivatives thereof.

EXAMPLE 4

In a three neck 100 ml flask equipped with a thermometer, condenser, dean stark trap mechanical stirrer and nitrogen inlet tube, 3.02 grams (0.005 moles) of the diamine produced in Example 3 and 2.22 grams (0.005 moles) of 2,2-bis-(3,4-dicarboxyphenyl) hexafluoropropane dianhydride were added to the flask along with 32 ml. of monochlorobenzene and 8 ml. of N-methyl pyrrolidone (NMP). The contents of the flask were heated to 90° C. under agitation after which 0.06 grams of para-toluene sulfonic acid was added. The mixture was heated to reflux temperature at 142° C. after which an additional 16 ml of monochlorobenzene and 4 ml of NMP were added. The contents of the flask were refluxed at 142°-145° C. for 10 hours. 20 ml of NMP was then added and the monochlorobenzene was distilled off at 155° C. The reaction mixture was then cooled to room temperature and precipitated using an ice/water/methanol mixture. The precipitate was washed with water and oven dried overnight at 125° C.

The resulting polymer has an inherent viscosity of 0.60 dl/g in dimethylacetamide as a 0.5% by weight solution at 25° C. and a number average molecular weight of 37,000.

This polymer has the following structure:

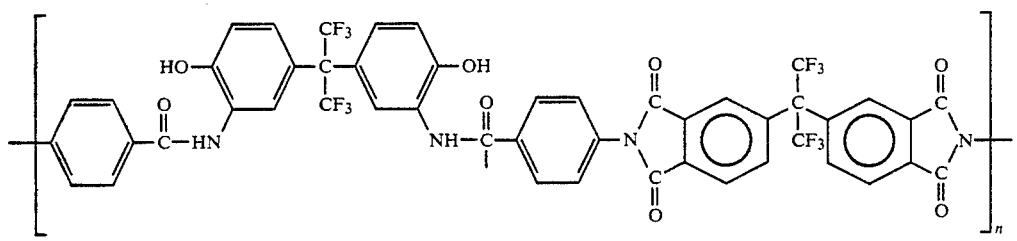

The polymer was dissolved in NMP to form a solution which was cast on a glass plate. The coated plate was subjected to an oven heating cycle to cyclize the polyamic acid portion of the linkage to form a polyamide-imide polymer, e.g., 70° C./1 hour, 100° C./1 hour, 150° C./1 hour, and 250° C./1 hour. A uniform flexible polymer film was obtained having a glass transition temperature of 345° C., and which remained soluble in NMP. The film was then further heated for 2 hours at 350° C. to obtain a polybenzoxazole-polyimide film having a glass transition temperature of 367° C., which was insoluble in NMP.

EXAMPLE 5

The process of Example 4 was repeated except that bis(3,4-dicarboxyphenyl)etherdianhydride (ODPA) was employed as the dianhydride monomer instead of 6F-DA. The monomers were present in the reaction media at a level of 3.02 gm (0.005 moles) of AHHP and 1.55 gm (0.005 moles) of ODPA.

EXAMPLE 6

The process of Example 4 was repeated, except that 3,3',4,4'-benzophenone tetracarboxylic acid dianhydride (BTDA) was employed as the dianhydride monomer instead of 6F-DA. The monomers were present in the reaction media at a level of 3.02 gm (0.005 moles) of AHHP and 1.62 gms (0.005 moles) of BTDA.

EXAMPLE 7

The process of Example 4 was repeated, except that 1,2,4,5-benzene tetracarboxylic acid dianhydride (PMDA) was employed as the dianhydride monomer instead of 6F-DA. The monomers were present in the reaction media at a level of 3.02 gm (0.005 moles) of AHHP and 1.09 gm (0.005 moles) of PMDA.

EXAMPLE 8

The process of Example 4 was repeated, except that 3,4',4,4'-diphenyl tetracarboxylic acid dianhydride (BPDA) was employed as the dianhydride monomer instead of 6F-DA. The monomers were present in the reaction media at a level of 3.02 gm (0.005 moles) of AHHP and 1.47 gm (0.005 moles) of BPDA.

EXAMPLE 9

The process of Example 4 was repeated except that 4,4'-bis[2-(3,4-dicarboxyphenyl) hexafluoroisopropyl]-diphenyl ether dianhydride (12F-DA) was employed as the dianhydride monomer instead of 6F-DA. The monomers were present in the reaction media at a level of 3.02 gms (0.005 moles) of AHHP and 4.73 gm (0.005 moles of 12F-DA.

The inherent viscosity of each of the polyamide-polyimide polymers produced in Examples 4–9 is reported in Table 1. Also reported are the weight average (Mw) and number average (Mn) molecular weights as measured by GPC, the glass transition temperatures of both the polyamide-polyimide and polybenzoxazole-polyimide polymers as measured by differential scanning calorimetry (DSC), and the characteristics of films prepared from the polyamide-polyimide and polybenzoxazole-polyimide films. The specific techniques for determining molecular weights and glass transition temperatures are standard methods as disclosed in copending application D-1276, the disclosure of which is incorporated herein by reference. The term soluble as used in the Table means solubility in N-methyl pyrrolidone (NMP) (as well as many other common solvents) while the term insoluble means insolubility in NMP.

As is evident from the data in Table 1, the polyamide-polyimide (PA-PI) and polybenzoxazole-polyimide (PBO-PI) polymers exhibit high glass transition temperatures and the PA-PI polymers give rise to solvent soluble and flexible films. After conversion to the polybenzoxazole form, the PBO-PI films are rendered solvent insoluble but retain their good flexibility except for the polymers of Examples 7 and 9.

TABLE 1

| EXAMPLE # | COMPONENT "A" | COMPONENT "B" | INHERENT VISC dl/g | PA-PI GPC Mw | PA-PI Film Tg (°C.) | PA-PI Film Film | PBO-PI Film Tg (°C.) | PBO-PI Film Film |
|---|---|---|---|---|---|---|---|---|
| 4 | Diamine of Ex. 3 | 6F-DA | 0.60 | Mw = 76,000 Mn = 37,000 | 345 | Soluble Flexible | 367 | Insoluble Flexible |
| 5 | Same | ODPA | 0.57 | Mw = 40,000 Mn = 20,000 | 312 | Soluble Flexible | 375 | Insoluble Flexible |
| 6 | Same | BTDA | 0.79 | Mw = 80,000 Mn = 18,000 | 336 | Soluble Flexible | 371 | Insoluble Flexible |
| 7 | Same | PMDA | 0.21 | * | * | Soluble Brittle | 400 | Insoluble Brittle |
| 8 | Same | BPDA | 0.55 | * | * | Soluble Brittle | * | Insoluble Flexible |
| 9 | Same | 12-F DA | 0.27 | * | 247 | Soluble Flexible | * | Insoluble Brittle |

*not tested

The polymers of this invention also exhibit improved thermal flow properties and may be melt spun to form fibers and filaments. Because of the good solubility of the PA-PI polymers in common organic solvents, films may be cast from solvent solutions and optionally may be converted to the polybenzoxazole form. Such films may be used as printed circuit backings, insulating dielectric interlayers and other applications where tough, flexible, high temperature stable films having good dielectric properties have been used in the past.

The polymers of this invention may be molded using standard techniques such as compression molding or injection molding to produce melt fabricated articles such as safety masks, windshields, electronic circuit substrates, airplane windows or the like. They may be compounded with graphite, graphite fiber, molybdenum disulphide or PTFE for the production of self-lubricating wear surfaces useful for piston rings, valve seats, bearings and seals. They may also be compounded with fibers such as glass, graphite or boron fibers to produce molding compounds for high strength structural components such as jet engine components. The polymers may also be compounded with friction materials to produce molding compounds for high temperature braking components or with abrasive materials such as diamonds for high speed grinding wheels.

The PA-PI polymers may be cast as films useful as wire and cable wraps, motor slot liners or flexible printed circuit substrates. They may be used as coatings on substrates such as aluminum or silicone dioxide. They are also useful to produce high temperature coatings for magnetic wire, dip coatings for various electronic components, protective coatings over glass, metal and plastic substrates, wire coatings, and photoresist coatings useful in microelectronic processing.

The PA-PI polymers may also be used to produce high temperature adhesives for bonding aerospace structures or electrical circuitry, conductive adhesives when mixed with conductive fillers such as silver or gold for microelectronic applications, or adhesives for glass, metal or plastic substrates.

The polymers may also be used as varnish compositions or matrix resins to produce composites and laminates. The varnish compositions and matrix resins may be used to impregnate glass or quartz cloth, or graphite or boron fibers, for the production of radomes, printed circuit boards, radioactive waste containers, turbine blades, aerospace structural components or other structural components requiring high temperature performance, non-flammability and excellent electrical properties.

It is to be understood that the above-described embodiments of the invention are illustrative only and that modifications throughout may occur to those skilled in the art. Accordingly, this invention is not to be regarded as limited to the embodiments disclosed herein, but is to be limited as defined by the appended claims.

What I claim is:

1. A polyamide-polyimide polymer comprising at least one recurring group of the structure:

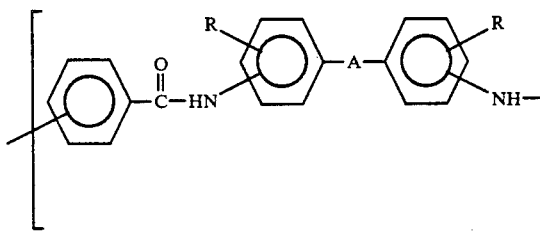

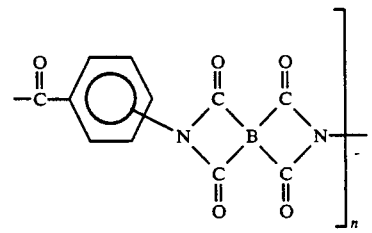

wherein the moiety B is a substituted or unsubstituted tetravalent aromatic radical selected from the group consisting of a benzene nucleus, polyphenyl nuclei having up to four phenyl rings and naphthalene nuclei, n is an integer sufficient to give rise to a polymer having an inherent viscosity of at least 0.1 dl/g as measured from a solution of the polymer in dimethylacetamide at 25° C. at a polymer concentration of 0.5 weight percent, A is selected from the group consisting of SO₂, O, S, CO, C₁ to C₆ alkyl, perfluoroalkyl or perfluoroarylalkyl having from 1 to 10 carbon atoms, and a carbon-carbon double bond directly linking the two aromatic groups, and R is hydrogen.

2. The polymer of claim 1 wherein the radical A is

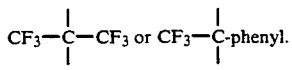

3. The polymer of claim 2 wherein the radical A is

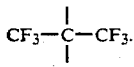

4. The polymer of claim 3 wherein the amido linkages are meta with respect to the A group.

5. The polymer of claim 4 wherein the imido linkages are para with respect to each amido linkage.

6. The polymer of claim 1 wherein the radical B is

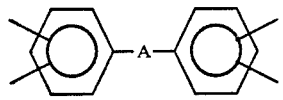

7. The polymer of claim 1 wherein B is the residuum nucleus of a dianhydride selected from the group consisting of 1,2,4,5-benzene tetracarboxylic acid dianhydride, bis(3,4-dicarboxy-phenyl) ether dianhydride, 3,3',4,4'-benzophenone tetracarboxylic acid dianhydride, 3,4',4,4'-diphenyl tetracarboxylic acid dianhydride, 2,2-bis(3,4-dicarboxyphenyl) hexafluoropropane dianhydride and 4,4'-bis[2-(3,4-dicarboxyphenyl) hexafluoroisopropyl] diphenyl ether dianhydride.

8. The polymer of claim 7 wherein, A is

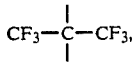

and the amido linkages are meta with respect to the A group.

9. The polymer of claim 8 wherein the imido linkages are para with respect to each amido linkage.

10. A solvent solution of the polymer of claim 1.

11. A dried film comprising the polymer of claim 1.